(No Model.)

B. SMITH.
GATE.

No. 279,832. Patented June 19, 1883.

Witnesses.
Louis F. Gardner
E. D. York

Inventor.
Benj. Smith,
per
F. A. Lehmann,
Atty.

UNITED STATES PATENT OFFICE.

BENJAMIN SMITH, OF CLAYTON, ILLINOIS.

GATE.

SPECIFICATION forming part of Letters Patent No. 279,832, dated June 19, 1883.

Application filed October 23, 1882. (No model.)

*To all whom it may concern:*

Be it known that I, BENJAMIN SMITH, of Clayton, in the county of Adams and State of Illinois, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in swinging gates; and it consists in the combination of a gate which is pivoted upon the top of a supporting-post, and which has pivoted upon its top a lever, to which the operating-cords are attached, and which lever, in being made to turn in either direction by the operating-cords, raises the latch upon the free end of the gate, so as to allow the cord to pull the gate open.

The object of my invention is to provide a gate which, while it is cheap and simple in construction, is supported upon a single bearing only, and which gate can be opened from either side by means of operating-cords which extend a suitable distance beyond the gate for the purpose of opening and closing it, and thus save people the trouble of getting out of their vehicles or dismounting from their horses.

Figure 1:
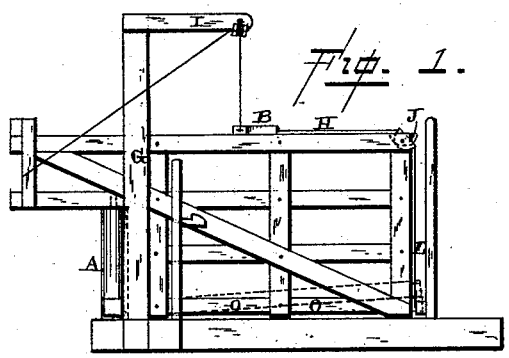
Figure 2:
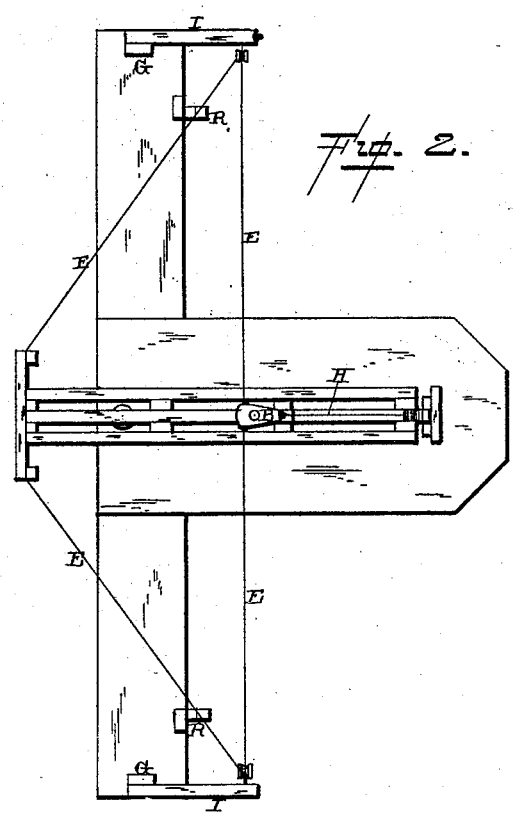

Figure 1 is a side elevation of my invention complete. Fig. 2 is a plan view of the same.

A represents the pivotal post upon which the gate turns, and against which the lower corner of the gate bears without being attached thereto by means of a hinge or any other device such as is generally used for this purpose. The upper portion of the gate is made to extend considerably beyond this pivotal post, for the purpose of forming a counterbalance for the front portion of the gate, and for forming a lever by means of which the gate can be closed by the operating-cord from either side. Upon the top of this gate is pivoted the lever B, to which the operating-cords E, upon opposite sides of the gate, are attached. These operating-cords extend to a considerable distance beyond each side of the gate to the posts G, are passed through the perforated boards I, or around pulleys attached thereto, and then have their outer ends fastened to the rear ends of the gate. When it is desired to open the gate, the person grasps the cord E which is nearest to him and then pulls downward upon it. This downward pull upon the cord operates the latch so as to unfasten the gate, and then by pulling on the cord toward the gate the gate swings open from him. After passing through the gate, the operator grasps the cord E upon the other side, and pulls toward the gate. The cord is grasped in about the same place upon each side of the gate both in opening and closing, and after the cord is taken hold of the grasp is not released until the gate is either opened or closed, as the case may be.

To the front end of the operating-lever is fastened the connecting-rod H, and to the outer end of this connecting-rod is fastened the pivoted lever J. It matters not in which direction the operating-lever may be turned, for it draws upon this lever J through the connecting-rod in such a manner as to turn the lever J upon its pivot, and thus raise its lower end. Attached to the lower end of the lever J in any suitable manner is a connecting rod, cord, or wire, L, which has its lower end fastened to the lower panel, O, of the gate. This panel of the gate is pivoted at its inner end, and at its other end extends beyond the front end of the gate far enough to form a latch for catching in the catch provided for it on the post against which the gate closes. When either one of the operating-cords is pulled, this panel is raised upward, so as to release the gate from the catch upon the post, and then the continued pull upon the cord causes the gate to swing open toward the person who is pulling it. After the person has passed through the gate, it is only necessary to pull upon that portion which has its ends fastened to the rear end of the gate, and the gate will swing shut. When the gate is opened in either direction it closes against the usual posts, R, which are generally provided for that purpose.

I am aware that a gate having an operating-lever pivoted upon its top, which lever is connected to cords or wires from opposite sides, and then connected to another lever or levers, for the purpose of raising the latch, is not new. My invention differs from this in the connection of the operating-cords to the gate and lever, and in the arrangement of the levers which operate the latch.

Having thus described my invention, I claim—

1. In a gate, the combination of the gate pivoted upon the post A, so that its rear end will project beyond the post, the lever B, pivoted on the gate, the posts G, having the guiding-boards secured thereto, and the operating-cords E, the cords being connected to the rear end of the gate at one of their ends and to the latch at their other ends, substantially as shown.

2. The combination of the gate, the operating-cords, the lever B, the connecting-rod H, the lever J, pivoted at the corner of the gate, the connecting-rod L, and the pivoted bar O of the gate, the cords being connected both to the rear end of the gate, beyond its pivotal point, and to the latch-operating mechanism, substantially as set forth.

In testimony whereof I affix my signature in presence of two witnesses.

BENJAMIN SMITH.

Witnesses:
 B. L. STRATHEN,
 WM. HAMILTON.